US007330477B2

(12) United States Patent
Hendel et al.

(10) Patent No.: US 7,330,477 B2
(45) Date of Patent: Feb. 12, 2008

(54) METHOD AND APPARATUS FOR STARVATION-FREE SCHEDULING OF COMMUNICATIONS

(75) Inventors: Ariel Hendel, Cupertino, CA (US); Fu-Kuang Frank Chao, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1157 days.

(21) Appl. No.: 10/328,454

(22) Filed: Dec. 24, 2002

(65) Prior Publication Data

US 2004/0120336 A1   Jun. 24, 2004

(51) Int. Cl.
*H04L 12/56* (2006.01)

(52) U.S. Cl. .................. 370/412; 370/235; 370/429

(58) Field of Classification Search ................. 370/233, 370/234, 414, 416, 417, 418
See application file for complete search history.

(56) References Cited

U.S. PATENT DOCUMENTS

| 5,404,353 | A | * | 4/1995 | Ben-Michael et al. ...... 370/235 |
| 5,465,335 | A | * | 11/1995 | Anderson ................... 718/107 |
| 5,483,526 | A | * | 1/1996 | Ben-Nun et al. ........ 370/395.7 |
| 5,633,867 | A | * | 5/1997 | Ben-Nun et al. ........... 370/399 |
| 6,078,565 | A | * | 6/2000 | Ben-Michael et al. ...... 370/236 |
| 6,459,698 | B1 | | 10/2002 | Acharya |
| 6,477,669 | B1 | * | 11/2002 | Agarwal et al. ............ 714/708 |
| 6,594,234 | B1 | * | 7/2003 | Chard et al. ................ 370/236 |
| 6,810,426 | B2 | * | 10/2004 | Mysore et al. .............. 709/234 |
| 7,046,678 | B2 | * | 5/2006 | Jiang et al. ............ 370/395.41 |
| 7,092,410 | B2 | * | 8/2006 | Bordonaro et al. ......... 370/516 |
| 2002/0141427 | A1 | | 10/2002 | McAlpine |
| 2002/0178282 | A1 | * | 11/2002 | Mysore et al. .............. 709/234 |

* cited by examiner

*Primary Examiner*—Chi Pham
*Assistant Examiner*—Kevin Mew
(74) *Attorney, Agent, or Firm*—Park, Vaughan & Fleming LLP

(57) ABSTRACT

A system and method for scheduling communications from a communication interface. Each of multiple send queues is associated with a destination and assigned to a logical communication channel. A list of stalled queues identifies those send queues for which a constraint restricts scheduling. When a queue is to be selected for service, a scheduler first attempts to find a member of the stalled queues list that is no longer stalled (e.g., any constraints were satisfied). Such a queue is selected for service if it exists. If there is no such queue, then all logical channels are examined and, from a list of send queues assigned to a selected logical channel, a send queue is selected for servicing. After a queue is scheduled from the stalled queues list, the list of queues assigned to its logical channel is adjusted (e.g., to place the queue at the tail of the list).

42 Claims, 7 Drawing Sheets

METHOD AND APPARATUS FOR STARVATION-FREE SCHEDULING OF COMMUNICATIONS

BACKGROUND

This invention relates to the field of computer systems. More particularly, a system and methods are provided for preventing the starvation of a packet or other communication queued for action (e.g., transmission).

In many computing environments, a communication interface (e.g., a network interface card, a channel adapter) maintains multiple queues of outbound packets, cells, frames or other communications. The communication interface is responsible for scheduling or preparing the communications for transmission, but must adhere to any applicable constraints. Depending on the type of communications, their destination, the status of the transmission network (e.g., whether it is congested), and so on, multiple constraints may be placed on individual communications, thereby delaying their transmission or preparation for transmission.

For example, a communication may be subject to constraints associated not only with the destination of the communication, but also the route or link(s) between the origination and destination. In particular, a constraint regarding the communication's destination may depend upon the status of the destination (e.g., whether it has room for the communication, whether a delay is required before sending the communication), while a constraint regarding the communication's route of travel may reflect congestion within one or more physical links the communication must traverse.

When multiple interfering constraints are applied to a system, they may cause arbitrary delays in scheduling a communication for transmission. Thus, even if a packet is cleared for its next hop by the recipient of that hop, it cannot be scheduled if the final destination has not approved it, and vice versa.

In general, whenever there are multiple sources (e.g., queues) of outgoing communications, and a communication may be subject to multiple constraints, those constraints may interfere with one another, thereby introducing undesirable delay. In existing communication interfaces, it is possible that a communication may be denied transmission for an indeterminate period of time or, alternatively, a communication link may be underutilized in an effort to avoid starving the communication.

Therefore, what is needed is a system and method for efficiently scheduling communications for transmission on a shared link, while promoting maximum usage of the link's bandwidth and without delaying any individual communication for an unbounded period of time.

SUMMARY

In an embodiment of the invention, a system and method are provided for starvation-free scheduling of communications from a communication interface subject to interfering constraints. For example, a "link" constraint preventing transmission on an individual link or hop of a path to a destination may interfere with a "path" constraint preventing transmission of a communication to the destination.

In one embodiment of the invention, multiple transmission queues are maintained on a communication interface. Each queue is associated with a destination and is assigned to a logical communication channel. The various logical channels are ordered in a first list; for each logical channel, another list orders the queues assigned to that channel.

Also, a separate list is maintained of stalled queues. Illustratively, a queue is stalled if a path constraint is not met (for more than a minimal time period), but all other constraints are, and the queue would otherwise be the next queue scheduled. A constraint may fail temporarily without a queue being considered stalled. In this embodiment, at any given time at most one queue assigned to a given logical channel may be included in the list of stalled queues.

When a queue is to be selected for service, a scheduler first attempts to find a member of the stalled queues list for which both link and path constraints are satisfied. Such a queue, if one exists, is immediately removed from the list of stalled queues and is scheduled. If there is no such queue, then a logical channel free from any link constraint is selected from the first list on a round-robin basis, and a queue is selected from among the active queues within the channel's list of queues.

In an embodiment of the invention configured for InfiniBand, a channel adapter maintains multiple send queues. Each send queue is assigned to a virtual lane and stores communications (or descriptors of communications) for one destination. A queue lacking sufficient end-to-end credits is not considered for scheduling, even if it contains queue elements (e.g., work queue elements). A path constraint may include a required inter-packet delay (IPD) to a destination, while a link constraint may reflect a need for sufficient virtual lane credits.

The virtual lanes (VL) defined within the channel adapter are logically arranged in an inter-VL list that can be selected or scheduled on a round-robin basis. For each virtual lane, the ready send queues assigned to that VL are arranged in an intra-VL list that can also be scheduled in a round-robin manner. A queue may be considered ready if it possesses end-to-end transmission credits and is not empty.

A separate list is maintained of send queues that reached the head of their intra-VL lists, but which are stalled because of an applicable constraint. For example, an IPD may be active for the queue's destination. When the scheduler is to select a send queue for servicing, it first attempts to remove and schedule a queue from the stalled queues list by taking the oldest member that is no longer blocked by any constraint. If successful, after the queue is removed for service the head of the queue's intra-VL list is advanced to prepare for the next scheduling decision within that list.

DETAILED DESCRIPTION

Figure 1:
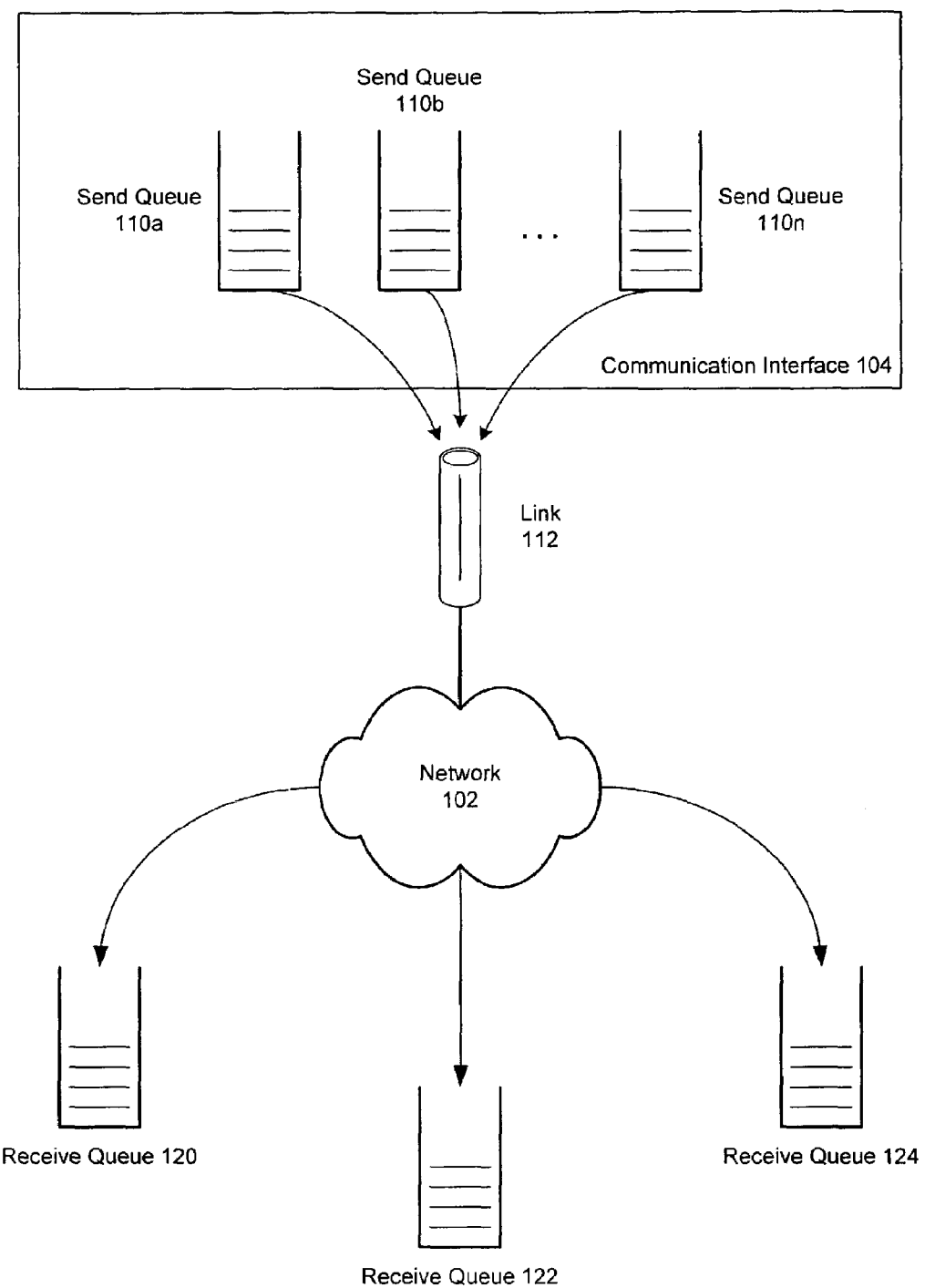
FIG. 1 is a block diagram depicting a communication environment in which multiple outgoing queues share one communication link.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In an embodiment of the invention, a scheduling apparatus and method are provided for servicing multiple queues. Servicing a queue may entail transmitting a queued element (e.g., a packet) or a communication identified by the element, or preparing the element or identified communication for transmission (e.g., by packetizing a set of data). In this embodiment, the maximum period of time that a queued communication can be delayed is bounded. The upperbound depends upon the configuration (e.g., topology) of the communication environment.

An embodiment of the invention is described herein as it may be applied within an InfiniBand environment or network. In this environment, computing systems and input/output subsystems are interconnected via high-speed serial links. Each system or subsystem employs an HCA (Host Channel Adapter) or a TCA (Target Channel Adapter) for sending and receiving communications over the links.

In this embodiment, a channel adapter maintains multiple queue pairs, wherein each queue pair includes a send queue and a receive queue for a connection between two endpoints. One or more queue pairs may be established between any pair of endpoints. Thus, when transmitting communications or preparing them for transmission (e.g., by packetizing a set of data), a channel adapter may receive communications from multiple send queues and transmit them over one physical link. A method and scheduling apparatus are provided for efficiently and fairly scheduling the communications for transmission.

In an InfiniBand environment, a physical communication link may be logically divided into multiple virtual lanes (VL). Different VLs may be allocated different portions of the total link bandwidth. Therefore, in addition to being dedicated to a connection with a particular destination, each send queue within a channel adapter is assigned to a particular virtual lane. Thus, when a send queue contains a communication to be scheduled for transmission, the communication is subject to any communication constraints involving the destination (or end-to-end connection), as well as any constraints associated with the assigned virtual lane (e.g., congestion on a particular link or hop).

In one embodiment of the invention, end-to-end constraints involve the need for sufficient credits from a destination before a source may transmit a communication to the destination. For example, the destination may issue one credit to the source for each message for which the destination has sufficient buffer space. These credits are herein termed "end-to-end credits." If the source has exhausted its credits from the destination for a particular connection, it cannot transmit to the destination for that connection even if it has one or more packets ready to go.

A constraint placed on a VL may also involve the need for credits. For example, a transmitting entity may not be permitted to transmit a communication on a particular VL of a link or hop unless it has been granted sufficient credits for that VL from the other endpoint of the link. Thus, for each VL used by a channel adapter, it must have sufficient credits before scheduling a communication for transmission on that VL. These credits are herein termed "link level credits."

In addition to end-to-end credits and link level credits, an InfiniBand environment may place a static rate control constraint on transmissions to a particular destination entity. More specifically, a channel adapter may be required to apply a delay between transmissions of consecutive packets or other communications to a specified destination. This delay may be an "inter-packet delay" (IPD) that applies across all queues with traffic for that destination.

Thus, in an embodiment of the invention, a channel adapter may need to consider end-to-end constraints (e.g., end-to-end credits), link constraints (e.g., link level credits) and path constraints (e.g., inter-packet delay) when processing communications from a plurality of send queues. Each send queue must have sufficient end-to-end credits to send a communication toward a destination, and sufficient link level credits to send the communication over the next link. Further, if an IPD has been activated, after one communication is transmitted to a particular destination (or scheduled for transmission) from one send queue, no other communication may be transmitted to that destination (or scheduled for transmission) until the IPD expires or is deactivated.

In other embodiments of the invention, for other types of communication environments, other types of constraints may be encountered. In general, an embodiment of the invention resolves interference between one or more constraints associated with a destination or end-to-end connection to the destination of a communication and one or more constraints associated with the links between the origination and destination.

FIG. 1 depicts a communication environment in which an embodiment of the invention may be implemented. In FIG. 1, communication interface or channel adapter 104 of a computer system or input/output subsystem includes multiple send queues 110a . . . 110n for queuing communications for transmission across shared link 112 and network 102. Network 102 may comprise an InfiniBand network and/or another packet-switched network such as the Internet.

Send queues 110a ... 110n store communications (e.g., packets, frames, cells) directed to receive queues 120, 122 and 124. Each receive queue may be maintained by a communication interface or channel adapter at a separate network endpoint (e.g., computer system, input/output subsystem), or more than one of the receive queues may be located at one entity.

Illustratively, in an implementation of this embodiment within an InfiniBand environment, for each send queue the channel interface also maintains a receive queue (not shown in FIG. 1). Together, an associated send queue and receive queue constitute a Queue Pair (QP) for handling a connection with another entity in the network.

Each send queue in FIG. 1 may be associated with a different destination entity, or more than one of the send queues may queue communications for the same destination. Similarly, each send queue may be assigned a different logical channel (e.g., virtual lane), or more than one of the queues may be assigned the same logical channel.

Network 102 may include any number of communication links and devices (e.g., switches, routers, repeaters), which may be shared by virtually any number of communication connections through the network. Thus, at any given time, any link within the network, or any logical channel traversing a link, may be congested and therefore need to reduce the amount of traffic sent through the physical link or logical channel. Further, because any endpoint (e.g., host, input/output subsystem) in the network may be involved in multiple connections, an endpoint may be congested and therefore need to reduce the rate at which other entities communicate with it.

Figure 2:
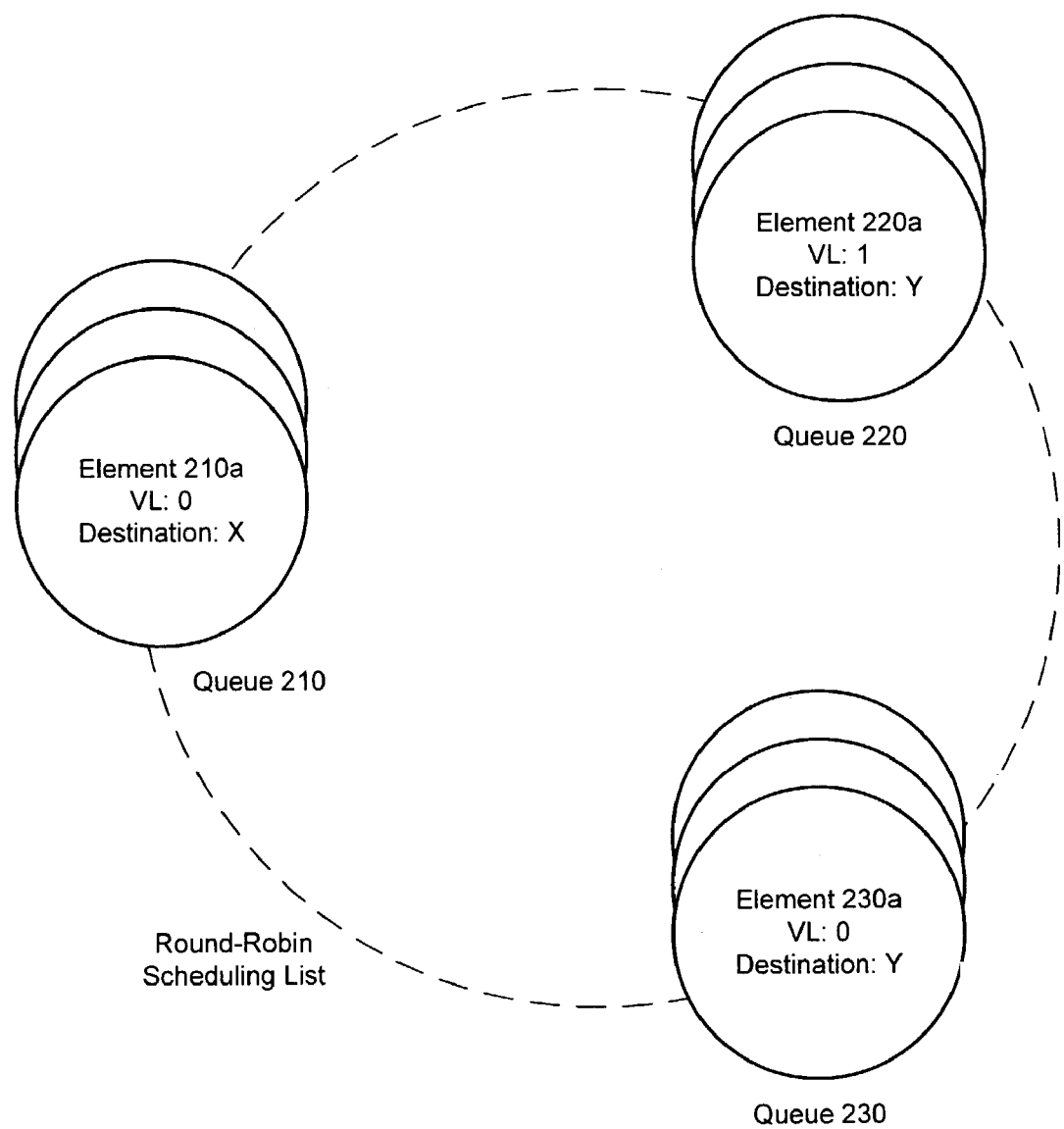
FIG. 2 is a block diagram of a round-robin scheduling list, wherein one queue or queue element may be blocked for an unbounded period of time.

FIG. 2 demonstrates how a queued communication may be starved because of interfering communication constraints within an InfiniBand communication environment, in the absence of implementation of an embodiment of the invention.

In FIG. 2, send queues 210, 220 and 230 are maintained by a communication interface such as an HCA or TCA. Each queue may include virtually any number of work queue elements (WQE). Illustratively, each WQE comprises a set of data (or identifies a set of data) to be divided into packets and transmitted over a communication link shared among the queues. Alternatively, each queue may contain individual packets to be scheduled for transmission.

Send queue 210 is assigned to virtual lane 0, and holds communications to be transmitted to a destination entity with a name or address of X. Queue 220 is assigned to VL 1 and stores communications directed to entity Y. Queue 230 is assigned to VL 0 and also stores communications addressed to entity Y. In FIG. 2, the queues are scheduled in round-robin fashion.

When it is time to schedule a communication (e.g., a packet) for processing or transmission, the scheduler must consider some or all of the constraints described above. Illustratively, however, a queue lacking sufficient end-to-end credits is not considered for scheduling, even if it contains one or more elements. In particular, a queue may not be considered "ready" for service unless it is not empty and has sufficient end-to-end credits for the queue's destination.

But, the scheduler servicing queues 210, 220 and 230 must still consider whether all link constraints (e.g., the need for sufficient link level credits) and path constraints (e.g., an IPD) are satisfied. In an embodiment of the invention, a destination's IPD is considered active whenever a timer configured to time that IPD is running (i.e., has not expired).

Because queue 210 and queue 230 share VL 0, and both queue 220 and queue 230 have the same destination, it is possible that element 230a of queue 230 may be delayed for an indeterminable amount of time. In particular, if no link level credits are currently available for VL 0, then only elements of queue 220 will be scheduled. And, by the time credits are received for VL 0, the inter-packet delay for destination Y may be active. Thus, every time an element from 220 is transmitted, the IPD kicks in and queue 230 is blocked. The IPD timer for the destination may then expire by the time the scheduler gets back to queue 220, which sends an element and again activates the IPD for destination Y.

To avoid this type of interference, in one embodiment of the invention scheduling constraints are resolved by separating the queues. In one implementation, a first scheduling list is populated with entries representing the different logical channels (e.g., virtual lanes) defined over a communication link for a channel adapter or other communication interface. This may be considered an "inter-LC list" or "inter-VL list" because it facilitates scheduling between the different logical channels or virtual lanes. For each logical channel (LC), another scheduling list is configured with one entry for each send queue assigned to that channel. These lists may be considered "intra-LC" or "intra-VL" lists because they facilitate scheduling within a logical channel. The inter-LC list and intra-LC lists may be configured as circular lists and serviced in round-robin fashion.

Figure 3:
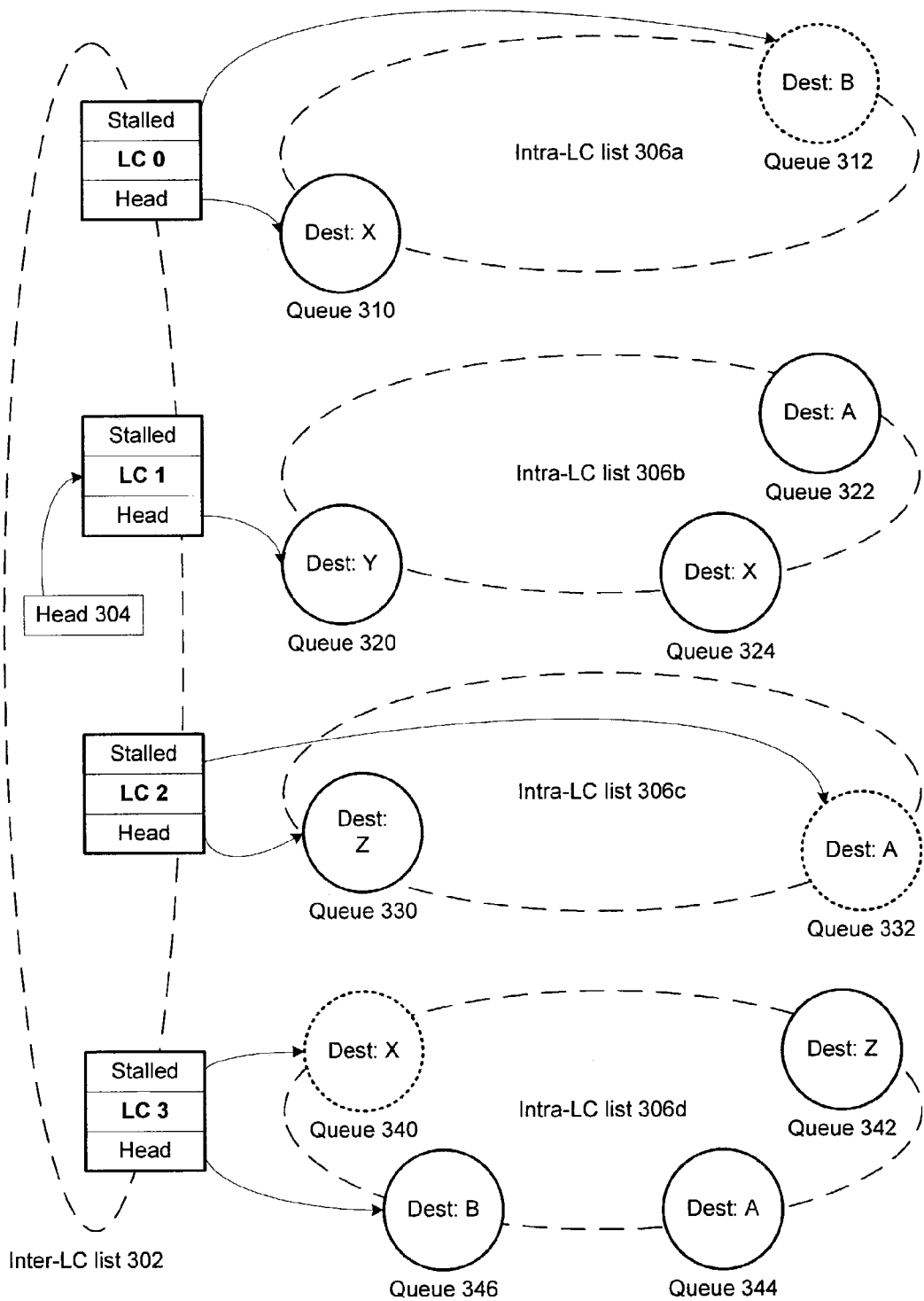
FIG. 3 demonstrates a separation of queues assigned to different virtual lanes of an InfiniBand network, in accordance with an embodiment of the present invention.

FIG. 3 demonstrates the separation of queues by logical channel, according to an embodiment of the invention. Inter-LC scheduling list 302 includes the four logical channels for which a channel adapter is configured in this embodiment. Each of intra-LC lists 306a, 306b, 306c and 306d includes the send queues assigned to a particular LC. Thus, logical channel 0 is shared by queues 310, 312; logical channel 1 is shared by queues 320, 322, 324; logical channel 2 is shared by queues 330, 332; logical channel 3 is shared by queues 340, 342, 344, 346.

As the scheduler traverses inter-LC list 302, a logical channel is scheduled only if sufficient link level credits are on-hand. Each entry in the list identifies the corresponding logical channel and includes a head pointer to identify the current or head queue in its intra-LC scheduling list. Similarly, head pointer 304 identifies the head or current entry in inter-LC list 302.

Illustratively, a head entry in a list may be the entry that is to be considered first when the scheduler examines the list for the next scheduling decision, or the entry that was last considered or scheduled during the scheduler's previous examination of the list. As each queue is serviced (or considered for service) in an intra-LC list, the head pointer is advanced.

In the embodiment of FIG. 3, each intra-LC list only includes queues assigned to one LC, and a queue is not considered (or ready) for scheduling until sufficient end-to-end credits have been received from the queue's destination. And, a queue will not be considered for scheduling if its logical channel lacks sufficient link level credits. Thus, in this embodiment, if a queue is stalled, it is stalled because of another, interfering, path constraint. For example, in an InfiniBand environment, the inter-packet delay of the queue's destination may have been triggered. Each entry in inter-LC list 302 also includes a pointer, list or other record of the first queue in its intra-LC list that is otherwise ready, but does not satisfy the interfering constraint (e.g., IPD).

In FIG. 3, queues 312, 332 and 340 are stalled. Illustratively, queue 312 may be stalled because queue 346 may continually trigger or activate the IPD for destination B, which expires just in time for queue 346 to be scheduled again. Similarly, queues 332 and 340 are stalled because of activity by other queues having the same destinations.

Figure 4:
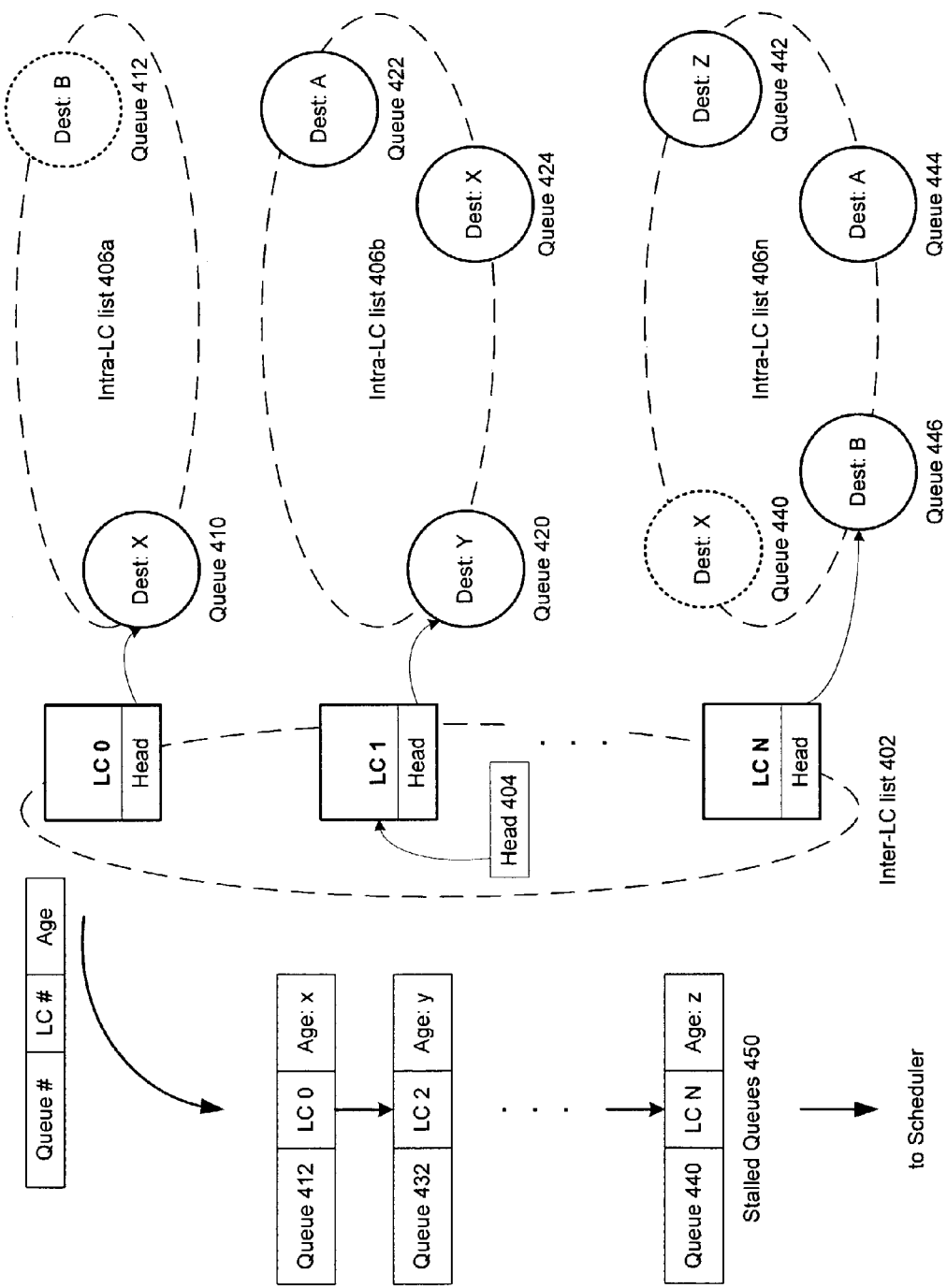
FIG. 4 depicts the use of a prioritized list of stalled send queues along with separated virtual scheduling lists, in accordance with an embodiment of the present invention.

FIG. 4 illustrates how the embodiment of the invention depicted in FIG. 3 may be configured to ensure that no queue or queue element is delayed for an unbounded period of time. The illustrated embodiment of the invention may be altered to suit virtually any communication environment without exceeding the scope of the invention.

In FIG. 4, inter-LC list (or inter-VL) 402 includes an entry for each logical channel (e.g., virtual lane) defined within a channel adapter or other communication interface. Head pointer 404 identifies the head or current entry in list 402. For each logical channel, there is an intra-LC list (or intra-VL list) comprising the active send queues assigned to that LC. Each entry in inter-LC list 402 includes a pointer to (or other identifier of) the current or head queue in its list.

However, in the embodiment of FIG. 4, queues that are stalled because of a path (e.g., IPD) constraint are added to stalled queues 450 (a queue, list or other structure). In this embodiment, logical channels are scheduled for attention (e.g., transmission or preparation for transmission) in round-robin order within inter-LC list 402 and individual queues are considered in round-robin order within the intra-LC lists. However, among stalled queues 450, the oldest entry receives priority.

In particular, each time the scheduling mechanism attempts to service a queue, it first attempts to remove a queue from stalled queues 450, especially the queue that has been stalled for the longest period of time. Illustratively, a queue may be removed and scheduled if sufficient link level credits are available for its logical channel (i.e., there are no link constraints) and IPD is not active for its destination (i.e., there are no path constraints).

If no entries can be removed from stalled queues 450, the scheduler then goes through the entries in inter-LC list 402 and attempts to service a queue within the associated intra-LC list (e.g., starting with the head entry). After servicing a queue, or failing to find a schedulable queue, the scheduler returns its attention to stalled queues 450.

If, while attempting to service a queue in an intra-LC list, the scheduler finds a queue that is stalled and assigned to a logical channel not currently represented in the stalled queues list, that queue is added to stalled queues 450. Thus, as long as no path constraints are active, scheduling is condensed to being performed in round-robin fashion between logical channels and among the queues assigned to a particular logical channel. In this embodiment of the invention, only one queue from a particular intra-LC list may reside in the stalled queues list at a time. Other embodiments may be implemented without this restriction.

Thus, in a method of scheduling according to one embodiment of the invention, two phases are defined. Phase 1 involves scheduling (or removing queues) from stalled queues 450 using priority (e.g., age), while Phase 2 schedules among the inter-LC and intra-LC lists in round-robin order. More specifically, in Phase 1, the oldest entry in stalled queues 450 is examined to determine if its blocking path constraint (i.e., IPD) is satisfied and sufficient link level credits are available for its logical channel. If so, the queue is removed from stalled queues 450, scheduled, and the head of its intra-LC list is adjusted accordingly.

In different embodiments of the invention, the scheduler may consider some or all queues within stalled queues 450 during Phase 1. Alternatively, it may halt Phase 1 and proceed to Phase 2 as soon as it determines that no member of the stalled queues list is schedulable.

During Phase 2, inter-LC list 402 and the intra-LC lists 406 are considered in round-robin fashion. Starting with the head entry in list 402 (identified by head pointer 404), each logical channel's list may be considered in turn. Illustratively, head pointer 404 is advanced from the head LC to the next LC after a queue in the head LC's intra-LC list is scheduled or serviced. Within an intra-LC list, each queue is considered in turn, starting with the head or current queue. While traversing an intra-LC list, if the scheduler finds a queue that is stalled, and the stalled queues list does not already include a queue assigned to that logical channel, that queue is added to stalled queues 450.

In an embodiment of the invention, Phases 1 and 2 may operate simultaneously, or nearly simultaneously. In this embodiment, a scheduler may remain in, or repeatedly visit, Phase 1 (i.e., to schedule queues from a stalled queues list) before visiting Phase 2. Thus, Phase 1 and Phase 2 do not necessarily imply a sequential scheduling algorithm between the two phases, and logic pertaining to the phases may operate in parallel. In the embodiment of the invention depicted in FIG. 4, the same IPD information (e.g., whether IPD is active for a particular destination) or other constraint information used in Phase 1 is used in Phase 2 to ensure a particular scheduling choice isn't misdirected in midstream.

Figure 5:
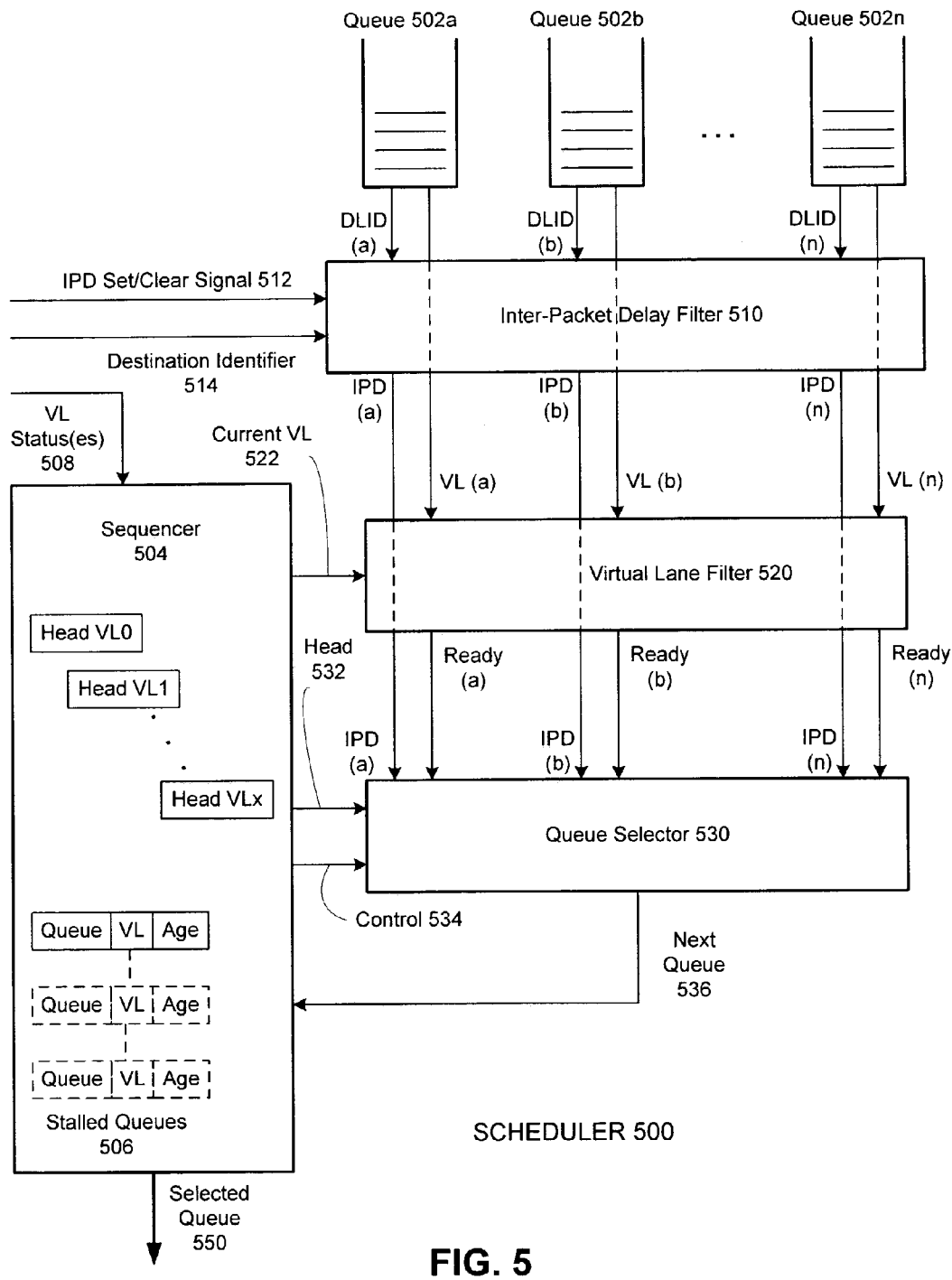
FIG. 5 is a block diagram of a scheduler for performing starvation-free scheduling of send queues, according to one embodiment of the invention.

FIG. 5 is a block diagram of a send queue scheduler according to one embodiment of the invention. This embodiment is configured for implementation within a host or target channel adapter of an endpoint (e.g., computer system, I/O subsystem) within an InfiniBand environment. Other embodiments may be derived from the following discussion (e.g., for other communication environments) without exceeding the scope of the invention.

Scheduler 500 of FIG. 5 services send queues 502a, 502b, . . . 502n. As described previously, each send queue stores communications (or descriptors of communications) to be sent from a source to a particular destination endpoint over a particular virtual lane (VL) or other logical channel. In this embodiment, a destination is identified by its DLID (Destination Local Identifier) or other destination identifier. Further, a communication (or communication descriptor) may be added to a send queue regardless of the number of available end-to-end credits for the destination. However, the queue will not be considered "ready" for scheduling (e.g., via the indicated ready signal) until sufficient end-to-end credits are available.

Sequencer 504 outputs a selected queue 550 with the assistance of inter-packet delay filter 510, virtual lane filter 520 and queue selector 530. Sequencer 504 maintains a list of stalled queues (i.e., stalled queues 506) and the head pointer for each intra-VL (or intra-LC) list of queues assigned to a particular virtual lane. Sequencer 504 also maintains a current VL value, which changes as each VL in the inter-VL (or inter-LC) list is considered, and is output as current VL 522.

A first module of scheduler 500, inter-packet delay (IPD) filter 510, filters or examines the send queues based on the IPD statuses of their destinations. Therefore, each send queue signals its destination identifier to IPD filter 510. For example, send queue 502a identifies its destination via signal DLID (a), queue 502b identifies its destination via signal DLID (b), etc.

IPD filter 510 receives two additional inputs in the illustrated embodiment: IPD set/clear signal 512 and destination identifier 514. IPD set/clear signal 512 indicates whether to set or clear an IPD indicator, and destination identifier 514 identifies the DLID of the indicator to be set or cleared. Illustratively, each time a packet or other communication is transmitted to a particular destination from the channel adapter, a corresponding IPD timer is automatically initiated.

While an IPD timer is running (i.e., IPD is active for the corresponding DLID), the associated IPD state indicator is cleared to indicate that nothing can be sent to that destination. When the IPD timer expires, the IPD state indicator is automatically set, which indicates that the channel adapter can once again transmit to that destination. Thus, depending on which IPD state indicators are set or cleared, some queues will be able to be scheduled and some will not.

Each send queue signals its assigned virtual lane to virtual lane filter 520. Thus, signal VL (a) identifies the virtual lane of queue 502*a*, while signals VL (b) and VL (n) identify the virtual lanes of queue 502*b* and queue 502*n*, respectively. Virtual lane filter 520 also receives current VL signal 522 from sequencer 504. Current VL signal 522 indicates the virtual lane that is currently being considered for scheduling.

Queue selector 530 receives, for each queue, an IPD state indicator regarding the queue's destination. Thus, IPD (a) carries the IPD state indicator for queue 502*a*, and so on. Queue selector 530 also receives, from virtual lane filter 520, a ready signal for each queue. Thus, Ready (a) reveals whether queue 502*a* is ready, Ready (b) reveals whether queue 502*b* is ready, etc. The ready signal, if asserted, indicates that the corresponding send queue is not empty and that sufficient end-to-end credits are on-hand for the queue's destination.

In FIG. 5, virtual lane filter 520 signals queue selector 530 with the corresponding ready signal(s) to restrict the "ready" condition to queues that are not empty, have sufficient end-to-end credits, and are assigned to the virtual lane identified by current VL 522. For the virtual lane identified by current VL 522, queue selector 530 is informed (e.g., via head 532) of which queue is at the head of the virtual lane's intra-VL list.

In one embodiment of the invention, next queue 536 identifies the first schedulable or stalled queue from the intra-VL list for current VL 522. This may require queue selector 530 to identify and skip one or more queues (e.g., queues that are not ready and/or queues for which IPD is active). Illustratively, when queue selector 530 identifies to sequencer 504 the first stalled queue it encounters in the intra-VL list, the queue is added to stalled queues 506.

Control signal 534 enables the scheduler to distinguish between an identification of a (next) stalled queue and an identification of the next schedulable queue. Thus, in the scheduler depicted in FIG. 5, queue selector 530 identifies both stalled and schedulable queues when it examines the queues in an intra-VL list. This allows the scheduler to perform Phase 2 operations for a particular virtual lane in a very efficient manner.

Selected queue 550 identifies either the schedulable queue identified by queue selector 530 or the oldest member of stalled queues 506 that is no longer blocked.

FIG. 6 demonstrates one method of selecting a queue for servicing or scheduling, according to one embodiment of the invention. In this embodiment, multiple queues are used to facilitate transmission of communications over a shared communication link that is logically divided into two or more logical channels.

Figure 6A:
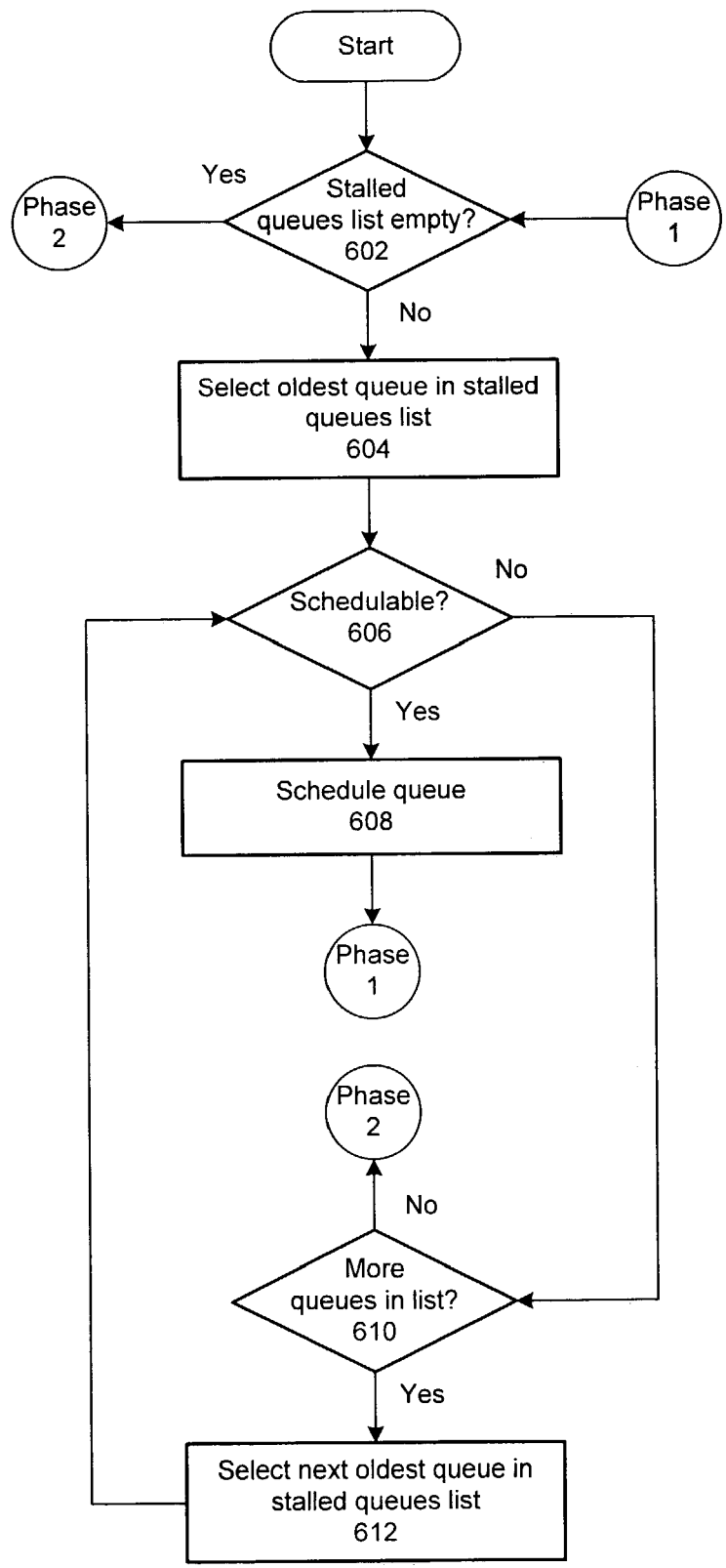
FIGS. 6A-B are a flowchart demonstrating a method of scheduling a queue for service, according to one embodiment of the invention.
Figure 6B:
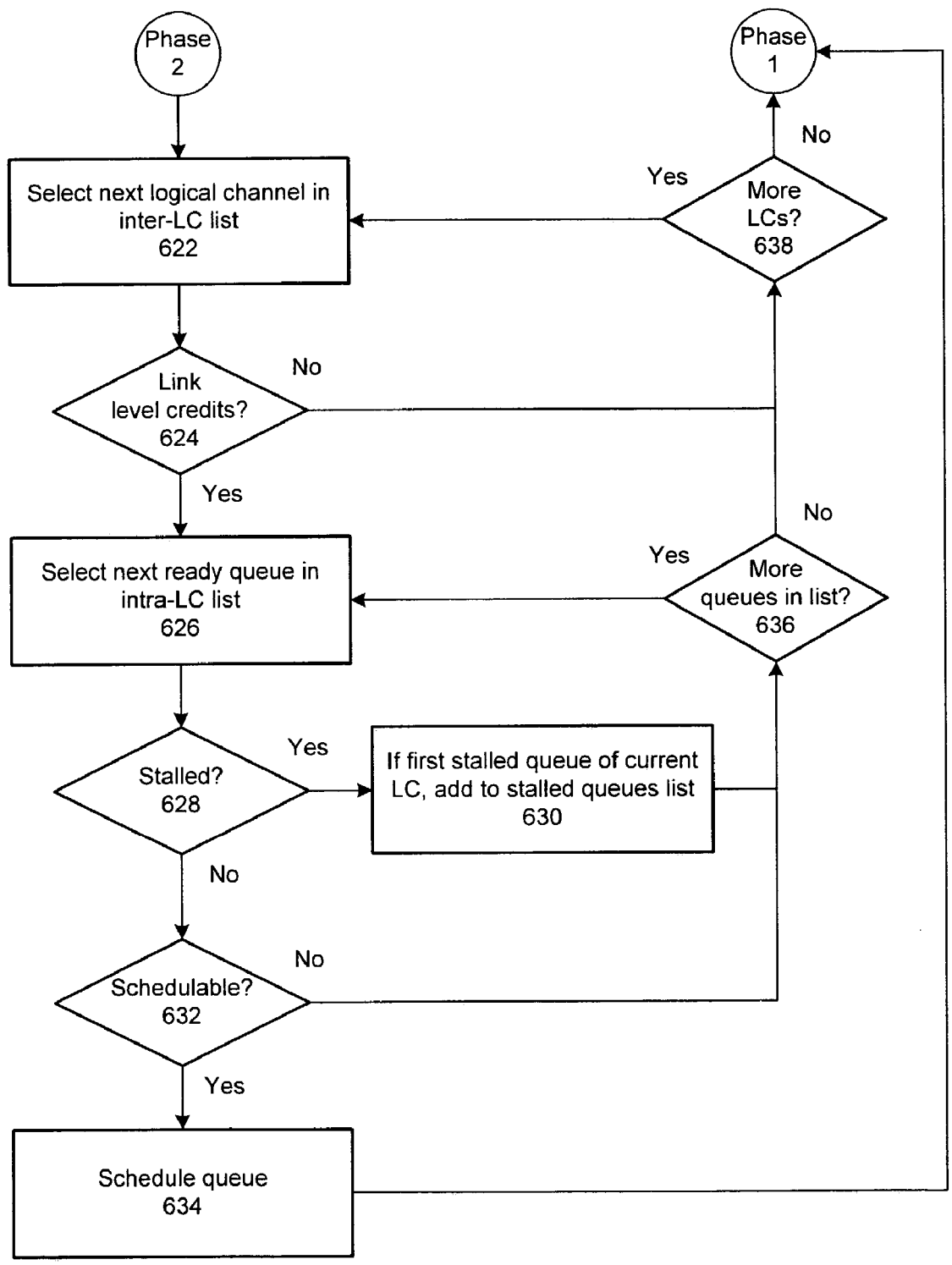

FIGS. 6A-B illustrate the selection of queues in each of two parallel phases of operation. As described above, during one phase of operation a list of stalled queues is considered for scheduling on a priority (e.g., age) basis. During the second phase, other queues are considered on a round-robin or other suitable basis.

In FIG. 6A, Phase 1 begins with operation 602, wherein the stalled queues list is examined to determine if it is empty. Whenever it is determined, during Phase 1, that nothing can be scheduled from the stalled queues list, the method shifts to Phase 2.

In operation 604, the oldest member (e.g., queue) of the list is selected. This selection may be facilitated by the consideration of an age field associated with each member.

In operation 606, the selected member of the list is examined to determine if it is schedulable. Illustratively, the queue may be considered schedulable if sufficient link level credits are on-hand for the queue's assigned logical channel, the queue is not empty and no other constraint prevents scheduling of the queue. For example, in an InfiniBand implementation of this embodiment, IPD must be inactive for the queue's destination. If the queue is not schedulable, the method advances to operation 610.

Otherwise, the queue is scheduled in operation 608 and Phase 1 resumes or re-commences.

In operation 610, a check is made for other members in the list of stalled queues. If no other members are present, then Phase 2 is entered.

Otherwise, in operation 612, the next oldest queue in the list of stalled queues is selected and Phase 1 resumes at operation 606.

In FIG. 6B, Phase 2 commences at operation 622, wherein the next logical channel (e.g., virtual lane) in a list of the LCs defined on the communication link is selected. Illustratively, a pointer may be employed to identify the head of the list or the next LC to be considered for scheduling.

In operation 624, a determination is made as to whether link level credits are available for the selected logical channel. If not, Phase 2 advances to operation 638.

In operation 626, sufficient link level credits are available for the selected LC, and so a list of queues assigned to the LC is accessed to select the next queue to be considered for scheduling. A pointer may be used to help identify the head of the list or the next queue to be considered. In this embodiment of the invention, only queues that are not empty are considered for scheduling.

In operation 628, the selected queue is examined to determine whether it is stalled. For example, an IPD timer may be active for the queue's destination, or some other path constraint may prevent scheduling of the queue. If the queue is stalled, the method continues at operation 630; otherwise, the method advances to operation 632.

In operation 630, the selected (stalled) queue may be added to the list of stalled queues to be examined in Phase 1. In the illustrated embodiment of the invention, only one queue at a time, from a list of queues assigned to a particular logical channel, may reside in the list of stalled queues. Thus, the selected queue is simply skipped if another queue from the list of queues assigned to the selected LC is already in the list of stalled queues. After operation 630, the method advances to state 636.

In operation 632, the selected queue is examined to determine if it is schedulable. Illustratively, if the queue is not stalled, it may be considered schedulable if it is not empty and no other constraints (e.g., IPD) prevent its scheduling. If not schedulable, Phase 2 advances to operation 636.

In one alternative embodiment of the invention, operations 626-632 may be performed in parallel for each LC that has link level credits. In this embodiment, a separate channel filter and queue selector (see FIG. 5) may be employed for each channel.

In operation 634, the selected queue is scheduled and Phase 1 resumes from the beginning.

In operation 636, it is determined whether any other queues in the current intra-LC list have not yet been examined. If so, the illustrated method returns to operation 626. Otherwise, the method advances to operation 638.

In operation 638, it is determined whether any logical channels in the inter-LC list have yet to be examined in this iteration of Phase 2. If all logical channels have been considered, the method returns to Phase 1. Otherwise, the method returns to operation 622 to consider the next LC in the inter-LC list.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of scheduling communication queues for service, comprising:
    maintaining multiple transmit queues on a communication interface, wherein each queue is configured to store communications to be transmitted to a destination through a communication link;
    assigning each queue to one of a plurality of logical channels defined on the communication link;
    maintaining a list of stalled queues, wherein a stalled queue is a queue prevented from being scheduled because of one or more constraints on the communication link or a path to a communication destination that traverses the communication link; and
    selecting one of the multiple queues for service by:
        searching the list of stalled queues for a first queue no longer subject to any of said one or more constraints;
        selecting said first queue if said searching is successful; and
        if said searching is unsuccessful, selecting a second queue from a list of queues assigned to a selected logical channel.

2. The method of claim 1, wherein said one or more constraints include:
    a link constraint; and
    a path constraint.

3. The method of claim 2, wherein said link constraint requires sufficient link level credits for a logical channel before a communication may be transmitted on the logical channel.

4. The method of claim 2, wherein said path constraint prohibits transmission of a communication to a destination unless an inter-packet delay associated with the destination is inactive.

5. The method of claim 1, wherein said one or more constraints include an end-to-end constraint requiring sufficient end-to-end credits for a destination before a communication may be transmitted to the destination.

6. The method of claim 1 wherein said searching the list of stalled queues comprises:
    searching the list of stalled queues in priority order;
    wherein the priority of an entry in the list or stalled queues is proportional to the age of the entry.

7. The method of claim 1, wherein said searching the list of stalled queues comprises:
    searching the list of stalled queues in order of their addition to the list of stalled queues.

8. The method of claim 1, wherein said selecting a second queue comprises:
    selecting a logical channel from the plurality of logical channels; and
    searching a list of queues assigned to the selected logical channel for a queue that is not stalled.

9. The method or claim 8, wherein said selecting a logical channel comprises:
    identifying a logical channel for which sufficient link level credits arc available to allow transmission of a communication on the selected logical channel.

10. The method of claim 8, wherein said selecting a logical channel comprises:
    examining, in round-robin order, one or more logical channels within the plurality of logical channels.

11. The method of claim 8, wherein said searching a list of queues comprises:
    examining in the list of queues assigned to the selected logical channel, a queue that has stalled; and
    adding the examined stalled queue to the list of stalled queues.

12. The method of claim 8, wherein said searching a list of queues comprises:
    examining one or more queues, in the list of queues assigned to the selected logical channel; and
    identifying a first schedulable queue in the one or more queues.

13. The method of claim 12, wherein a queue is schedulable if it is not stalled and not empty.

14. A computer readable storage medium storing instructions that, when executed by a computer, cause the computer to perform a method of scheduling communication queues for service, the method comprising:
    maintaining multiple transmit queues on a communication interface, wherein each queue is configured to store communications to be transmitted to a destination through a communication link;
    assigning each queue to one of a plurality of logical channels defined on the communication link;
    maintaining a list of stalled queues, wherein a stalled queue is a queue prevented from being scheduled because of one or more constraints on the communication link or a path to a communication destination that traverses the communication link; and
    selecting one of the multiple queues for service by;
        searching the list of stalled queues for a first queue no longer subject to any of said one or more constraints;
        selecting said first queue if said searching is successful; and
    if said searching is unsuccessful, selecting a second queue from a list of queues assigned to a selected logical channel.

15. A method of selecting one of a plurality of send queues from which to schedule a data communication for transmission, comprising:
    (a) searching a list of stalled send queues for a first send queue that is no longer stalled, wherein:
        (a1) a send queue is considered stalled and placed in said list of stalled send queues if the send queue is subject to one or more constraints; and
        (a2) a stalled send queue is considered no longer stalled if the send queue is no longer subject to any constraint;
    (b) if said searching is successful:
        (b1) scheduling a data communication from said first send queue for transmission over a communication link on which multiple logical channels are defined; and
    (c) if said searching is unsuccessful:

(c1) selecting a first logical channel from a first scheduling list comprising all logical channels to which the send queues are assigned;
(c2) from a second scheduling list comprising send queues assigned to the first logical channel, selecting a second send queue that is not in said list of stalled queues; and
(c3) scheduling a data communication from said second send queue for transmission on the first logical channel of the communication link.

16. The method of claim 15, wherein said searching comprises examining each send queue in said list of stalled send queues in the order of their insertion in said list of stalled send queues.

17. The method of claim 15, wherein said (b) further comprises:
(b2) repeating said (a) and said (b).

18. The method of claim 15, wherein said (h) comprises:
scheduling said communication from the first send queue fix transmission on a first logical channel to which the first send queue is assigned.

19. The method of claim 15, wherein said one or more constraints include a link constraint requiring sufficient link level credits for a logical channel before a communication may be transmitted on the logical channel.

20. The method of claim 15, wherein said one or more constraints include a path constraint requiring an inter-packet delay to be inactive before a communication may be transmitted to a destination of a send queue.

21. The method of claim 15, wherein said one or more constraints include an end-to-end constraint requiring one or more end-to-end credits for the destination of a send queue before a communication may be transmitted to the destination from the send queue.

22. The method of claim 15, wherein said (a) comprises:
identifying a candidate queue within said list of stalled queues;
identifying a logical channel to which the candidate queue is assigned; and
determining whether sufficient transmission credits are available for the logical channel to allow a communication to be transmitted from the candidate queue on the logical channel.

23. The method of claim 15, wherein said (a) comprises:
identifying a candidate queue within said list of stalled queues; and
determining whether an inter-packer delay is active for the destination of the candidate queue.

24. A computer readable storage medium storing instructions that, when executed by a computer, cause the computer to perform a method of selecting one of a plurality of send queues from which to schedule a data communication for transmission, the method comprising:
(a) searching a list of stalled send queues for a first send queue that is no longer stalled, wherein:
(a1) a send queue is considered stalled and placed in said list of stalled send queues if the send queue is subject to one or more constraints; and
(a2) a stalled send queue is considered no longer stalled if the send queue is no longer subject to any constraint;
(b) if said searching is successful:
(b1) scheduling a data communication from said first send queue for transmission over a communication link on which multiple logical channels are defined; and
(c) if said searching is unsuccessful:
(c1) selecting a first logical channel from a first scheduling list comprising all logical channel to which the send queues are assigned;
(c2) from a second scheduling list comprising send queues assigned to the first logical channel, selecting a second send queue that is not in said list of stalled queues; and
(c3) scheduling a data communication from said second send queue for transmission on the first logical channel of the communication link.

25. An apparatus for scheduling queues for servicing, comprising:
a plurality of send queues, wherein each send queue is configured to queue data communications to be transmitted to a destination via an assigned logical channel;
a stalled list configured to identify one or more of the send queues, wherein each send queue identified in the stalled list was prevented from being scheduling because of a path constraint on transmissions to the send queue's destination;
a logical channel filter configured to determine whether a first logical channel is subject to a link constraint;
a queue selector configured to identify a first send queue to be serviced, wherein the first send queue is assigned to the first logical channel; and
a scheduler configured to select for scheduling one of:
a send queue identified in the stalled list that is no longer subject to the path constraint; and
the first send queue.

26. The apparatus of claim 25, further comprising:
a delay filter configured to determine whether transmissions to a first destination are subject to the path constraint.

27. The apparatus of claim 25, wherein the path constraint comprises a delay between consecutive transmissions to the first destination.

28. The apparatus of claim 25, wherein the link constraint comprises a requirement for sufficient link level credits before transmitting on a logical channel.

29. The apparatus of claim 25, further comprising:
a list comprising the logical channels to which the send queues are assigned.

30. The apparatus of claim 25, further comprising:
for each logical channel to which a send queue is assigned, a list comprising the send queues assigned to the logical channel.

31. The apparatus of claim 25, wherein the scheduler selects for scheduling a send queue identified in the stalled list unless;
the stalled list is empty; or
every send queue identified in the stalled list is still prevented from being scheduled because of the path constraint on transmissions to the send queue's destination.

32. A communication interface for transmitting data communications over a communication link, comprising:
multiple send queues for queuing data communications for transmission to multiple destinations, wherein each send queue is configured to transmit on an associated logical channel of the communication link;
a list of stalled send queues:
a list of all logical channels to which the multiple send queues are assigned:
for each logical channel in said list of logical channels, a list of send queues assigned to the logical channel;
a first filter configured to determine whether transmissions to a destination are subject to a first constraint;

a second filter configured to determine whether transmissions on a logical channel of the communication link are subject to a second constraint; and a scheduler configured to:
identify a first schedulable send queue associated with a first logical channel; and
if any send queue associated with a first logical channel is stalled, identify a first stalled send queue associated with the first logical channel.

33. The communication interface of claim 32, wherein said scheduler is further configured to:
determine whether a first send queue associated with the first logical channel is ready;
wherein the first send queue is ready if the first send queue is not empty and riot subject to said second constraint.

34. The communication interface of claim 33, wherein the first send queue is schedulable if the first send queue is ready and not stalled.

35. The communication interface of claim 34, wherein the first send queue is not stalled if the first send queue is subject to neither said first constraint nor said second constraint.

36. The communication interface of claim 32, wherein a send queue is stalled if the send queue is subject to said first constraint.

37. The communication interface of claim 32, wherein said first constraint comprises a requirement for a delay between consecutive transmissions to the destination.

38. The communication interface of claim 32, wherein said second constraint comprises a requirement for sufficient link level credits before transmitting on the logical channel.

39. The communication interface of claim 32, wherein said first filter is further configured to receive from each send queue, an identifier of the send queue's destination.

40. The communication interface of claim 32, wherein said second filter is further configured to receive, from each send queue, an identifier of the send queue's associated logical channel.

41. The communication interface of claim 32, wherein said selector is further configured to:
receive, from said first filter, an indication of whether a first send queue is subject to said first constraint.

42. The communication interface of claim 32, wherein said selector is further configured to:
receive, from said second filter, an indication of whether a logical channel associated with a first send queue is subject to said second constraint.

* * * * *